(12) United States Patent
Bourdon (10) Patent No.: US 8,684,468 B2
(45) Date of Patent: Apr. 1, 2014

(54) BACK SUPPORT FOR CHAIR

(75) Inventor: Denis Bourdon, Ottawa (CA)

(73) Assignee: Alveus Innovations Inc., Ottawa, Ontario (CA)

( * ) Notice: Subject to any disclaimer, the term of this patent is extended or adjusted under 35 U.S.C. 154(b) by 0 days.

(21) Appl. No.: 13/481,992

(22) Filed: May 29, 2012

(65) Prior Publication Data

US 2013/0320745 A1    Dec. 5, 2013

(51) Int. Cl.
*B60R 21/00* (2006.01)
*A47C 7/00* (2006.01)

(52) U.S. Cl.
USPC ........................................ 297/466; 297/411.1

(58) Field of Classification Search
USPC ......... 297/411.1, 411.2, 411.25, 411.29, 466, 297/230.1, 230.13
See application file for complete search history.

(56) References Cited

U.S. PATENT DOCUMENTS

| | | | |
|---|---|---|---|
| 3,167,068 A * | 1/1965 | Carr | 602/32 |
| 3,287,064 A * | 11/1966 | Freeman | 297/466 |
| 4,145,074 A | 3/1979 | Hendricks | |
| 4,431,234 A * | 2/1984 | Lacey | 297/484 |
| 4,603,689 A | 8/1986 | Horner | |
| 5,868,694 A * | 2/1999 | Marlow et al. | 602/32 |
| 7,097,628 B1 | 8/2006 | Baune | |

OTHER PUBLICATIONS

A listing of medical devices from Sichuan Province Shengyuan Medical Devices Co., Ltd. (http://scsyyl.en.alibaba.com) dated Jan. 13, 2012.
A picture of a chair from the website: http://i01.i.aliimg.com/photo—cervical vertebra traction chair dated Jan. 13, 2012.
A picture of a chair from the website: http://www.jn-huale.com dated Jan. 13, 2012.

* cited by examiner

*Primary Examiner* — Milton Nelson, Jr.
(74) *Attorney, Agent, or Firm* — Carter, DeLuca, Farrell & Schmidt, LLP (57) ABSTRACT

A back support for use in combination with a chair is provided. The back support may be used to remove body weight of a person from lower regions of the body, including the spine and pelvic region. The back support generally comprises first and second harness supports positionable at an upper region of a backrest of the chair, first and second harness supports being spaced apart and extending generally upwardly from the backrest when positioned at the chair, first and second harness supports each having an upper portion, and first and second harnesses suspendable from the respective upper portions of first and second harness supports, each of first and second harnesses being engageable with the body of the person or being engageable with additional harness structure that engages the body for transferring at least a portion of the weight of the person to the first and second harness supports.

16 Claims, 6 Drawing Sheets

BACK SUPPORT FOR CHAIR

FIELD OF THE DISCLOSURE

The present disclosure relates generally to back supports, and more particularly to a back support for use in combination with a chair.

BACKGROUND

Back supports and other traction devices and systems for relieving compression forces on the neck and back are known in the art. Many of these existing devices apply an extension force to the head or torso of the person to relieve pressure on the neck and back.

Back supports and traction devices for use while a person is in a seated position are also known in the art.

However, many of these devices and systems have one or more components that require significant clearance around the chair, such as beside, behind, and/or above the chair. As a result, such devices are not well suited for chairs located in small environments. These small environments can include but are not limited to passenger compartments of vehicles.

In addition, many existing devices and systems have many components, making them heavy, expensive, difficult to install, and/or cumbersome to use.

SUMMARY

The present disclosure provides a back support for use in combination with a chair, the back support bearing at least a portion of the body weight of a person sitting in the chair. In particular, the back support can apply traction to the person to remove body weight of the person from the spine including the lower spine, the pelvic region, and other regions of the body while the person is in a seated position.

In one aspect, the present disclosure provides a back support for use in combination with a chair having a backrest, the back support for bearing at least a portion of the weight of a person positioned in the chair, the back support comprising: first and second harness supports positionable at an upper region of the backrest of the chair, first and second harness supports being spaced apart and extending generally upwardly from the backrest when positioned at the chair, first and second harness supports each having an upper portion; and first and second harnesses, the first harness being suspendable from the upper portion of the first harness support and the second harness being suspendable from the upper portion of the second harness support, each of first and second harnesses being engageable with the body of the person or being engageable with additional harness structure that engages the body of the person for transferring at least a portion of the weight of the person to the first and second harness supports, wherein the back support is securable to the chair.

BRIEF DESCRIPTION OF THE DRAWINGS

The present disclosure will be better understood having regard to the drawings in which.

DETAILED DESCRIPTION

The present disclosure is described herein in one or more embodiments with reference to the Figures. While these embodiments are described as being used in combination with a vehicle-type chair, the scope of the present disclosure is not intended to be limited to back supports for vehicle chairs. The present back support can be used in other applications, and with other types of sitting furniture.

The present disclosure provides a back support for use in combination with a chair having a backrest. A function of the back support is to bear at least a portion of the weight of a person sitting in the chair. The back support generally comprises first and second harness supports positionable at an upper region of the backrest of the chair. The first and second harness supports extend generally upwardly from the backrest when the back support is positioned at the chair. Each of the first and second harness supports has an upper portion. In addition, the back support comprises first and second harnesses. The first harness is suspendable from the upper portion of the first harness support and the second harness is suspendable from the upper portion of the second harness support. First and second harnesses can directly contact and engage the body of a person sitting in the chair. For example, each of the first and second harnesses can define a loop for extending around a shoulder and underarm of the person for bearing at least a portion of the weight of the person. In one or more other embodiments, first and second harnesses can engage another harness or other suitable body supporting structure, which in turn contacts and engages the body of a person. For example, in at least one embodiment, first and second harnesses can be engageable with a body harness that is capable of engaging the body of a person to support, in combination with the rest of the back support structure, at least a portion of the weight of the person. In addition, the back support is securable to the chair.

The back support may be used to remove body weight of a person from the spine including the lower spine, the pelvic region, and other regions of the body. Body weight is transferred to the back support at the upper region of the body so that the overall body weight on the lower regions of the body is reduced.

The various features and components of the present back support are now described with reference to the Figures.

Figure 1:
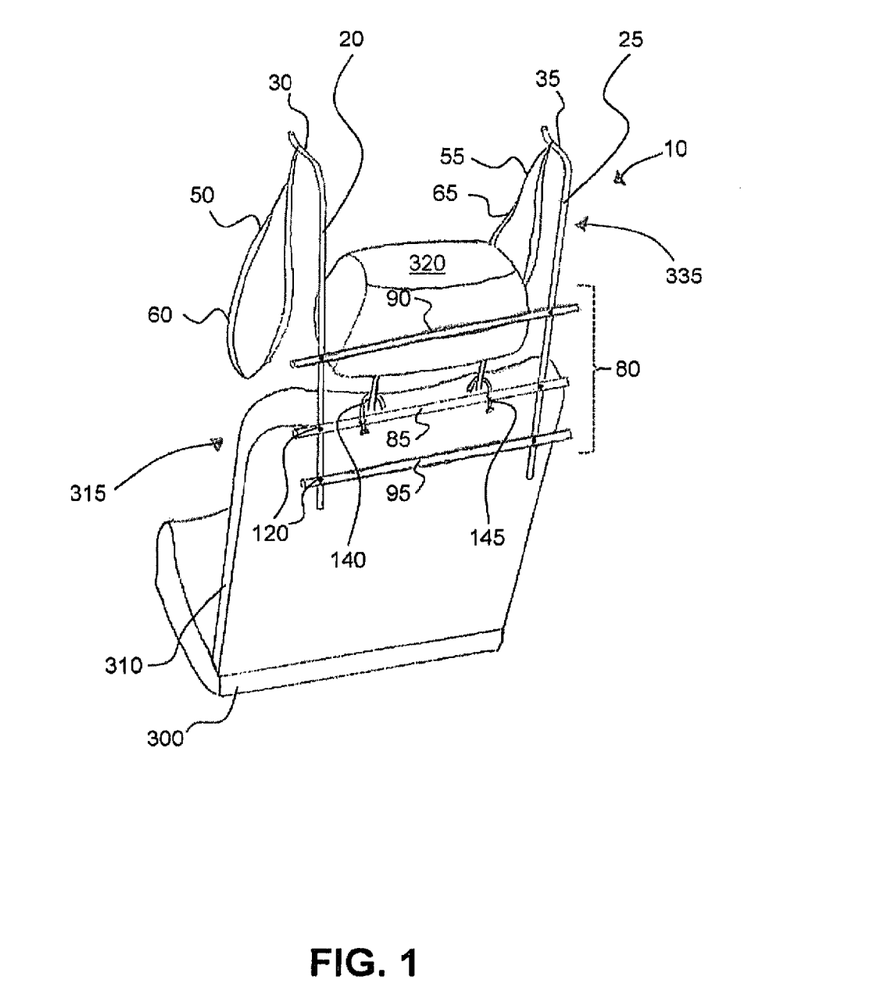
FIG. 1 is a rear perspective view of a chair with one embodiment of the present back support disposed at the chair.

Reference is made to FIG. 1, which shows a perspective view of one embodiment of the back support according to the present disclosure, the back support being positioned on a chair. Back support 10 generally comprises first and second harness supports 20 and 25, respectively, which can be positioned at an upper region 315 of a backrest 310 of a chair 300. When positioned at chair 300, first and second harness supports 20 and 25 extend generally upwardly from backrest 310.

Back support 10 also generally comprises first and second harnesses 50 and 55, respectively, for engaging the body of a person sitting in chair 300. First harness 50 can be disposed at an upper region 30 of first harness support 20, whereas second harness 55 can be disposed at an upper region 35 of second harness support 25. As shown in the Figures, each of first and second harnesses 50 and 55 can be suspendable from harness supports 20 and 25.

Figure 3:
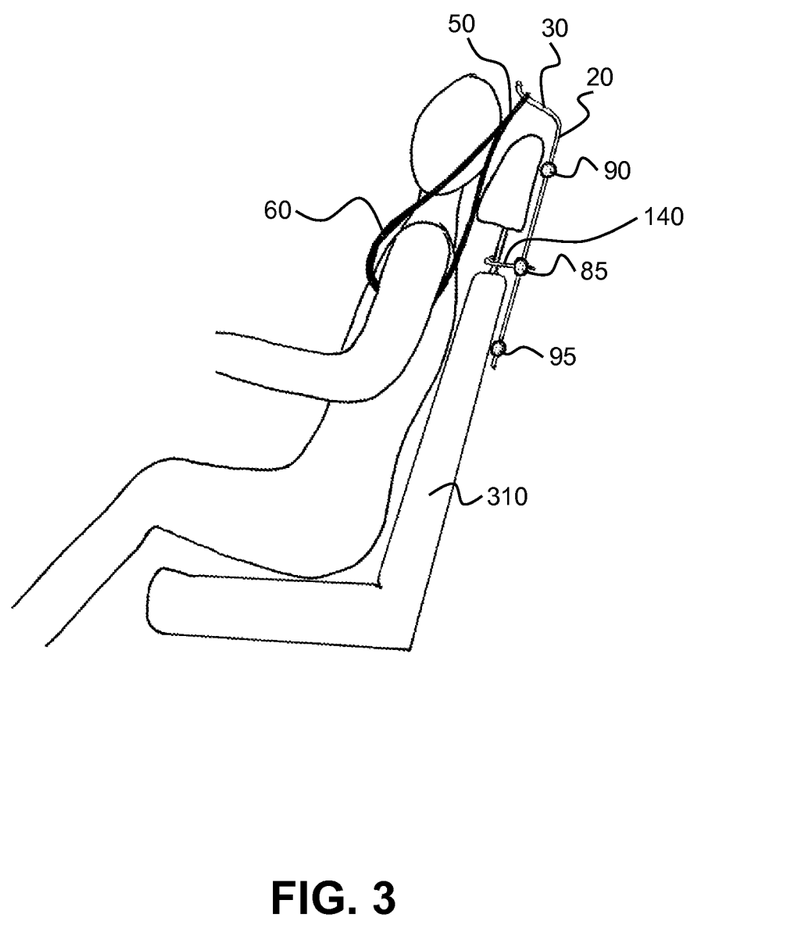
FIG. 3 is a side view of the chair and embodiment of the present back support shown in FIG. 1, the view also showing a person sitting in the chair.
Figure 4:
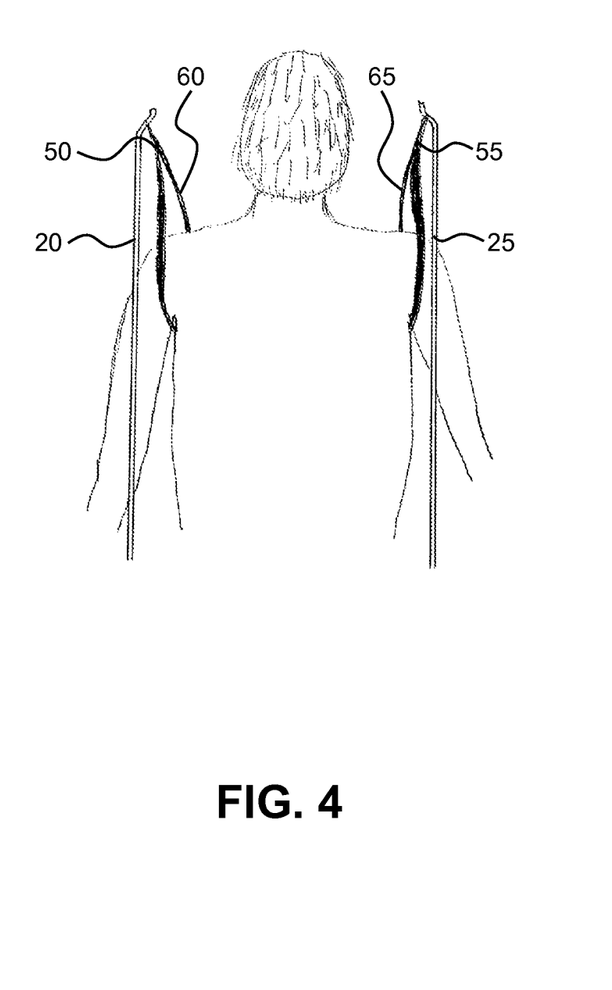
FIG. 4 is a view of the harness supports and corresponding harnesses of one embodiment of the present back support, the view showing how the harnesses can engage the body of the person.

In addition, first and second harnesses 50 and 55 can each define a loop 60 and 65, respectively, for engaging the body of the person sitting in the chair. As best shown in FIGS. 3 and 4, in at least one embodiment each loop can be adapted to extend around a shoulder and underarm of the person.

As mentioned above, in one or more other embodiments, first and second harnesses can engage another harness or other suitable body supporting structure (not shown), which in turn contacts and engages the body of a person. The additional harness structure can be any suitable harness structure that is capable of engaging the body of a person to transfer at least a portion of the weight of the person to first and second harness supports 20 and 25.

Back support 10 is securable to chair 300 so as to transfer the at least a portion of the body weight of the person to the chair. Back support 10 may be secured to the chair in any suitable way. In at least one embodiment, back support 10 will be releasably securable to the exterior of the chair. In at least one other embodiment (not shown), back support 10 can be at least partially receivable into the chair. For example, a lower end portion of each harness support 20 and 25 can be partially receivable into backrest 310 of chair 300. In addition, the chair can comprise one or more structural components for receiving and supporting one or both harness support 20 and 25 therein.

Turning back to FIG. 1, back support 10 may also comprise a base support structure 80 coupled to harness supports 20 and 25. Base support structure 80 can interconnect harness supports 20 and 25 to brace and rigidify back support 10. In at least one embodiment, base support structure 80 extends between and is connected to first and second harness supports 20 and 25.

Various features and components of the present back support are now described in more detail.

First and second harness supports 20 and 25 can have any suitable shape and size. As shown in the Figures, in at least one embodiment each harness support is in the form of a rod. However a harness support need not be in the form of a rod. Each harness support may generally be of a length such that it extends at least from an upper region 315 of a chair to at least a head region 335 of the chair. In at least one embodiment, each harness support extends at least to the head region 335 of the chair so that the upper regions 30 and 35 of each harness support extend above the shoulders of a person sitting in the chair. The positioning of upper regions 30 and 35 of each harness support above the shoulders of a person allows harnesses 50 and 55 to be suspended from upper regions 30 and 35 to bear at least a portion of the body weight of the person.

The distance above the backrest of the chair which harness supports 20 and 25 can extend may be limited by the amount of clearance above the chair. This distance may be limited by an obstruction located above the chair, such as a ceiling. For example, in the situation where the present back support is used in combination with a chair in a vehicle, the ceiling of the vehicle may limit the distance above the backrest by which the harness supports can extend.

Furthermore, harness supports 20 and 25 may be spaced apart when the back support is installed at a chair. As shown in the Figures, in at least one embodiment, first and second harness supports can be spaced apart such that the distance between upper region 30 of first support 20 and upper region 35 of second support 25 is approximately the width of the shoulders of a person. The spacing allows harnesses 50 and 55 to be suspended over the shoulders of the person sitting in the chair. In addition, this positioning of the upper regions 30 and 35 of harness supports 20 and 25, respectively, allows back support 10 to be compact in size. Since the upper regions 30 and 35 can be positioned above the shoulders of a person, they do not need to extend above the head of the person as is the case with many existing back support and traction devices. In many existing back support systems, the one or more harness supports extend above the head region of the person sitting in a chair. Very often the harness for supporting body weight of the person is connected to a connection point at a position located above the head region of the person. As a result, these existing back support systems require significant clearance above the head of the person. Such systems are not well suited for environments having little or no clearance above the head of the person. These environments can include but are not limited to passenger cabins of vehicles. In contrast, the present back support requires little or no additional clearance above the head of a person sitting in the chair.

In at least one embodiment, the distance between harness supports 20 and 25 can be adjustable. For example, the spacing of the harness supports can be adjusted to suit the physical characteristics of a person using the back support. This includes adjusting the distance to correspond approximately to the width of the shoulders of the person. The adjustability of the distance between harness supports 20 and 25 can be useful for other reasons, for example for adjusting back support 10 to fit a particular chair, or the environment in which the chair is located.

The distance between harness supports 20 and 25 can be made to be adjustable in any suitable way. For example, in the embodiments shown in the Figures, one or both harness supports 20 and 25 can be connectable to base support structure 80 at two or more different positions. In this way, the distance between the harness supports can be adjusted.

The distance between harness supports 20 and 25 can also be made to be adjustable in one or more embodiments of back support 10 not comprising a base support structure 80. This can be accomplished in any suitable way.

Figure 2:
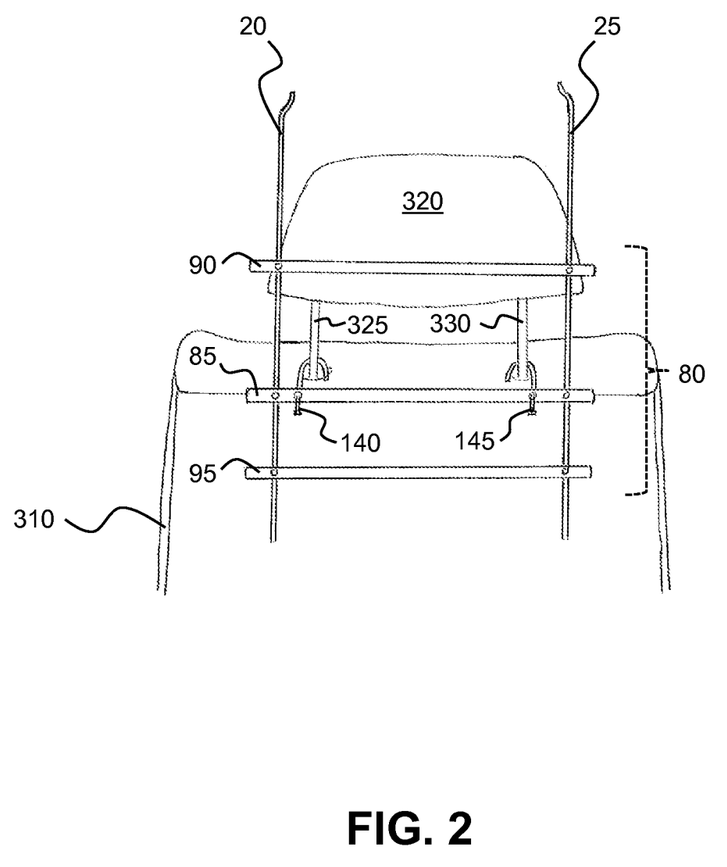
FIG. 2 is a rear view of an upper portion of the chair and embodiment of the present back support shown in FIG. 1.

Back support 10 can comprise a base support structure 80 coupleable to harness supports 20 and 25, for example to brace the harness supports, and to rigidify and stabilize the back support. As shown in FIGS. 1 to 3, base support structure 80 can extend between and be connected to first and second harness supports 20 and 25. In at least one embodiment, base support structure 80 comprises at least a first base cross support 85 extending between and interconnecting first and second harness supports 20 and 25. However, base support structure 80 can comprise one or more additional base cross supports. For example, in the embodiments shown in the Figures, cross support structure includes second and third cross supports 90 and 95. Additional base cross supports can be used to further stabilize back support 10 on chair 300. For example, second base cross support 90 can serve as a brace between harness supports 20 and 25. In addition, second base cross support 90 can brace harness supports 20 and 25 against chair 300, specifically against the headrest of the chair, when the back support bears some weight of the person sitting in the chair.

Figure 5:
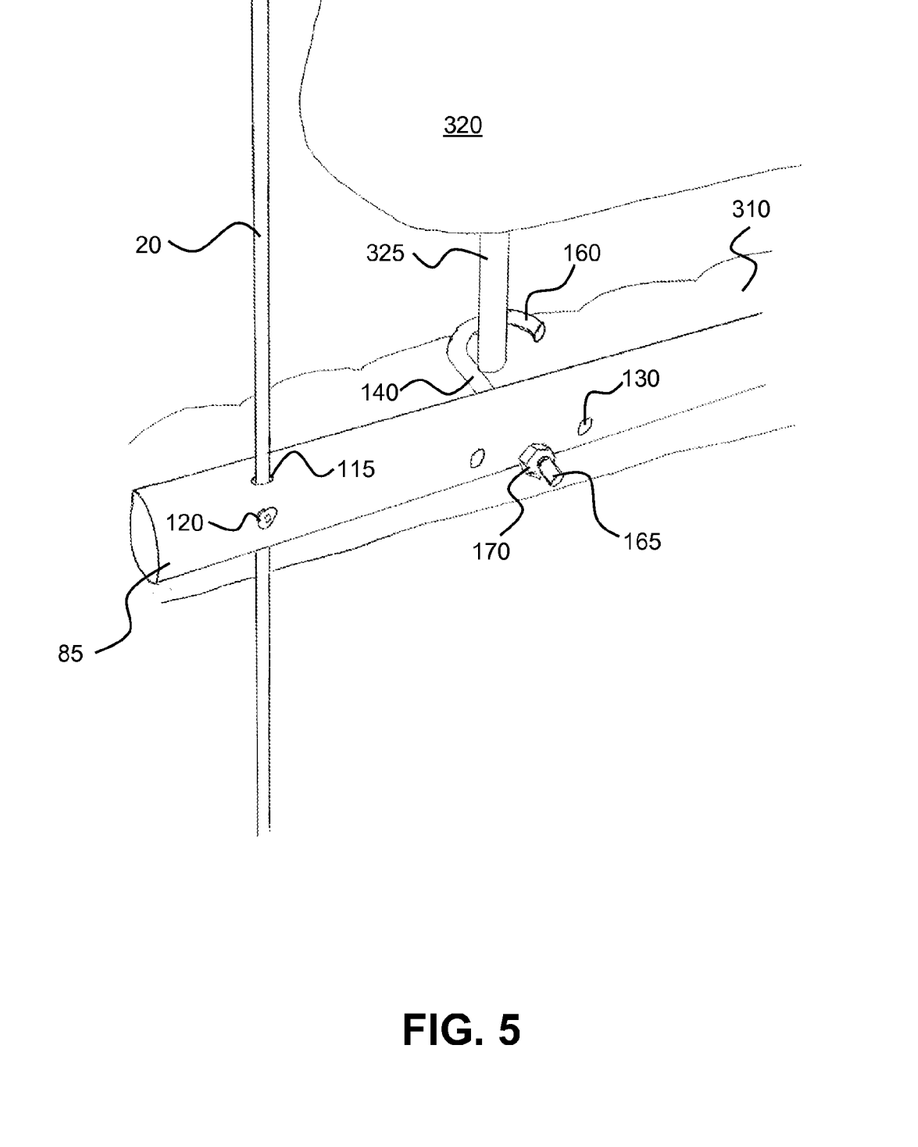
FIG. 5 is a close up perspective view of the embodiment shown in FIG. 1, the view showing the engagement of the back support to a chair.

The one or more base cross supports can be coupled or connected to first and second harness supports 20 and 25 in any suitable way. As seen in the Figures, in at least one embodiment, each of the one or more base cross supports can define apertures 115 therethrough, each aperture 115 for receiving a respective harness support. This structure is best shown in FIG. 5. The one or more base cross supports can be positionally adjustable along first and second harness supports 20 and 25. In other words, in at least one embodiment, the one or more base cross supports can be secured at one of at least a plurality of different positions along the harness supports. In addition, as mentioned above, the distance between the harness supports can also be adjustable. For example, with reference to FIG. 5, in at least one embodiment the one or more base cross supports 85, 90, 95 can define one or more additional apertures for a given harness support in addition to the single aperture 115 shown in FIG. 5. The one or more additional apertures can be spaced apart from one another and extend generally along the longitudinal axis of the base cross support. Thus the embodiment shown in FIG. 5 could be modified by adding one or more apertures to the left and/or right of aperture 115. However, the spacing between harness supports 20 and 25 can be made to be adjustable in any other suitable way. For instance, a harness support can be connected to a base cross support using one or more brackets, connectors, fasteners, etc.

The adjustability of the one or more base cross supports can allow for the adjustment of the back support. For example, the position of the one or more base cross supports can be adjusted when back support 10 is being adjusted or configured for installation onto or with a specific chair. In addition, the adjustability of the one or more base cross supports can allow for the adjustment of the position of upper regions 30 and 35 of the harness supports above the chair. This can be useful for adjustment of the back support to adapt to the particular physical attributes of the person using the back support.

As shown in FIGS. 1, 2, and 5, the one or more base cross supports can be retained in position relative harness supports 20 and 25 by way of one or more fasteners 120. For example, as best seen in FIG. 5, fastener 120 can be in the form of a bolt, which can be tightened and loosened to selectively secure a base cross support to a harness support. When fastener 120 is in a loosened state, base cross support 85 can be slid along harness support 20 for adjustment of the back support. However, the one or more base cross supports can be retained in position relative harness supports in any other suitable way.

In addition, first base cross support 85 is shown in the Figures to have a tubular or cylindrical form. However, the one or more base cross supports can be in any other suitable form.

Furthermore, back support 10 can comprise at least one chair engaging member for engaging the chair to retain the back support to the chair. The at least one chair engaging member may be adapted to engage one or more portions or regions of the chair. As shown in the Figures, in at least one embodiment, back support 10 can have first and second chair engaging members 140 and 145, respectively. Chair engaging members 140 and 145 can be engageable with headrest 320 of the chair. More specifically, a chair engaging member can engage a support post of a headrest. For example, chair engaging members 140 and 145 are engageable with headrest support posts 325 and 330, respectively. Furthermore, a chair engaging member can have a portion thereof that is shaped to engage a headrest support post. In at least one embodiment, as shown best in FIG. 5, chair engaging member 140 can have a hook-shaped portion 160 for hooking around a headrest support post 325.

The one or more chair engaging members generally extend from the back support. In at least one embodiment, chair engaging members 140 and 145 extend from base cross support 85. Having reference to FIG. 5, chair engaging member 140 is coupled to base cross support 85. Chair engaging member 140 is received through base cross support 85 through an aperture (not shown) therein. The proximal end of chair engaging member 140 can be threaded and can be retained in position relative to base cross support 85 by way of nut 170. However, the one or more chair engaging members can be coupled or otherwise connected to a base cross support in any other suitable way.

Figure 6:
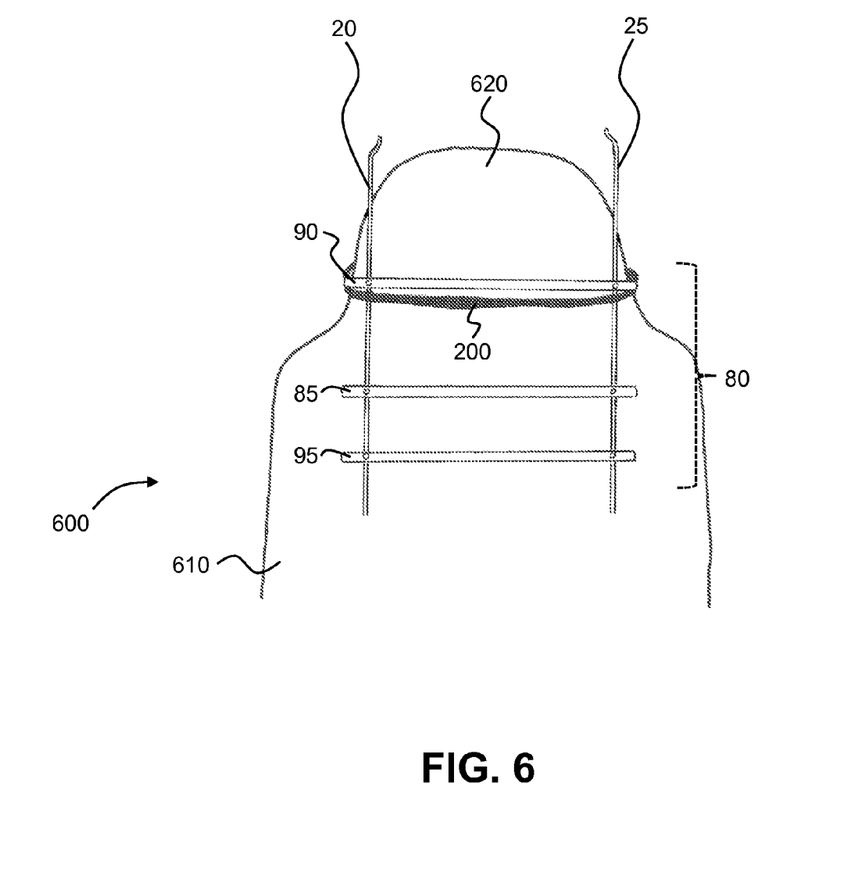
FIG. 6 is a rear view of another embodiment of the present back support disposed on a different chair.

In at least one other embodiment, as shown in FIG. 6, back support 10 can engage a chair 600 not having any headrest support posts. The configuration shown in FIG. 6 is similar to the configuration shown in FIG. 2. However, the headrest 620 of chair 600 shown in FIG. 6 is not supported relative to the backrest portion 610 of the chair by any headrest support posts. Rather, headrest 620 is integrally formed with backrest 610. In this particular embodiment, back rest 10 is suitably retained in position at chair 600 by way of any suitable retaining means. As shown in FIG. 6, retaining means can be in the form of a strap or belt 200 that engages back support 10 as well as chair 600 in order to support back rest 10 and at least a portion of the weight of a person sitting in the chair. Strap 200 can extend around headrest 620 of the chair. Headrest 620 of the chair has a smaller width than backrest portion 610. Thus back support 10 is retained in the desired position on the chair (i.e. will not slide down the backrest) when at least a portion of the weight of person is transferred to the back support.

In addition to the above, it is to be appreciated that back support 10 can be suitably retained in position at a chair in any other suitable way.

One or more protective components (not shown) can be added to back support 10 for the safety of a person located behind the chair. Protective components can cover any potentially dangerous components of back support, such as any sharp or hard components. This could be desirable where back support 10 is used in a vehicle and one or more passengers can be seated behind the chair on which the back support is mounted. The protective components can serve to reduce the impact of a person with the back support while a vehicle is in motion, including during a collision. The protective components can be of any suitable type, including but not limited to protective caps and padding. One or more protective components can be added to cover one or more components of the back support, such as securing hardware (nuts, bolts, etc.), base cross supports, and harness supports.

In addition, the present back support can provide for the selective adjustment of the distance between a distal end of a chair engaging member and the base support structure to allow for the tightening and loosening of the back support to the chair. This adjustability can also be useful to enable the back support to be used with chairs of various shapes and sizes. As shown in FIG. 5, in at least one embodiment the combination of a threaded end 165 of chair engaging member 140 and nut 170 can provide this adjustability. The turning of nut 170 can adjust the distance between hook portion 160 of chair engaging member 140 and base cross support 85. It is to be appreciated however that this adjustability can be provided in any suitable way.

The one or more chair engaging members can also be positionally adjustable on the back support. This adjustability can allow the back support to configured for engagement with various different types of chairs. For example, a chair engaging member can be at least positionally adjustable in a transverse direction to the first and second harness supports. In other words, a chair engaging member can be adjustable in the horizontal direction. This adjustability can be achieved in any suitable way. As shown in FIG. 5, in at least one embodiment a base cross support can define one or more apertures 130 therethrough for receiving a chair engaging member. Apertures 130 can be spaced apart along the longitudinal axis of the base cross support. A chair engaging member can therefore be positioned at any one of these apertures. However, it is to be appreciated that the one or more chair engaging members can be made positionally adjustable in any other suitable way. This includes but is not limited to the use of one or more brackets, connectors, and fasteners.

Harnesses 50 and 55 may be attached, secured, or otherwise engaged with harness supports 20 and 25 in any suitable way. For example, in at least one embodiment, a harness may simply rest on the upper region of a harness support without being attached or fastened thereto. As shown in the Figures, the distal ends of upper portions 30 and 35 may be flared or otherwise extend generally upwardly to prevent harnesses 50 and 55 from slipping off of the harness supports 20 and 25. In addition, although not shown in the Figures, upper portions 30 and 35 each could define some form of a notch or recess, or otherwise comprise a retainingly shaped portion for retaining the harness in position at the harness support. A portion of each harness 50 and 55 could rest in the notch or retainingly shaped portion. In such an embodiment, a person can easily and quickly engage and disengage harnesses 50 and 55 from harness supports 20 and 25. In at least one other embodiment, one or both of harnesses 50 and 55 can be secured to harness supports 20 and 25. In at least another embodiment, one or more of the harnesses can be releasably secured to the harness supports in any suitable way.

First and second harnesses 50 and 55 can also be adjustable to allow for a desired fit of the harnesses around the person using the back support. For example, the size of the loop of each harness can be selectively adjustable. The adjustability may be provided by way of a buckle, or by any other suitable means.

In at least another embodiment, one or both of the harnesses can be statically sized, meaning that it is not adjustable. For instance, each harness can be in the form of a strap formed into a loop. In such a case, the harnesses can be selected so that their dimensions are suitable for the specific person who will be using the back support. In addition, if the particular embodiment so allows, the heights and positions of the harness supports can be adjusted to suit the fit of the back support to the particular person.

In addition, one or more of the harnesses can comprise at least one elastomeric portion to provide for resilient stretching of the harness. The resilient stretching of a harness can provide for a less restrictive fit of the harness during use, and can also provide for a more comfortable fit. For example, the at least one elastomeric portion can be disposed in the loop of the harness so as to allow the size of the loop to resiliently expand. However, one or more elastomeric portion can be disposed elsewhere in the harness. In at least one embodiment, first and second harnesses can be in the form of elastomeric straps. However, the harnesses can be made of another material, or a combination of materials.

Furthermore, as previously mentioned above, in one or more other embodiments, first and second harnesses can engage another harness or other suitable body supporting structure. The additional harness structure in turn contacts and engages the body of a person. The additional harness structure can be any suitable harness structure that is capable of engaging the body of a person to transfer at least a portion of the weight of the person to first and second harness supports 20 and 25. In at least one embodiment, the additional harness structure can be in the form of a body harness that engages a portion of the torso of a person. For example, the body harness can wrap around the torso region of the person. In addition, each of first and second harnesses can extend between and engage the additional harness structure and first and second harness supports 20 and 25 to support at least a portion of the weight of a person sitting in a chair.

As mentioned above, the additional harness structure can be in the form of any suitable body supporting structure, including any suitable body harness or body support girdle. For example, Safco Products Company of New Hope, Minn. sells various types of body and back supporting devices, one or more of which may be suitable for use in the present back support. In at least one embodiment, a Safco back support belt can be used. This type of back support generally has a support portion that surrounds the abdominal region of the torso, and further comprises a pair of elastically stretchable suspenders extending from the support portion. The suspenders are adapted extend over the shoulders of a person to position and retain the support portion on the body of the person. In use, the pair of suspenders can serve as first and second harnesses, and can thus be engaged with upper portions 30 and 35 of first and second harness supports 20 and 25.

In the one or more embodiments in which first and second harnesses engage an additional harness structure, first and second harnesses can be in any suitable shape and form. For example, rather than being in the form of loops 60 and 65, first and second harnesses can be in the form of straps, cords, bands, or any other suitable supporting structure.

The present back support can be used in combination with a chair for supporting or bearing at least a portion of the weight of a person positioned in the chair. In use, the first harnesses will be positioned around a first shoulder and underarm of the person, whereas the second harness will be positioned around a second shoulder and underarm of the person. The harnesses may be secured or otherwise engaged with the harness supports either before or after the harnesses have been positioned around the person. The harnesses can be adjusted or selected such that the back support bears at least a portion of the body weight of the person when the person is positioned in the chair.

Methods consistent with the teachings of the present disclosure for supporting at least a portion of the weight of a person positioned in a chair are also contemplated.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Moreover, the previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed:

1. A back support for use in combination with a chair having a backrest, the back support for bearing at least a portion of a weight of a person positioned in the chair, the back support comprising:
   first and second harness supports positionable at an upper region of the backrest of the chair, the first and second harness supports being spaced apart and extending generally upwardly from the backrest when positioned at the chair, and the first and second harness supports each having an upper portion;
   first and second harnesses, the first harness being suspendable from the upper portion of the first harness support and the second harness being suspendable from the upper portion of the second harness support, each of the first and second harnesses being engageable with the body of the person or being engageable with additional harness structure that engages the body of the person for transferring at least a portion of the weight of the person to the first and second harness supports; and
   a base support structure extending between and interconnecting the first and second harness supports, wherein the base support structure comprises a first and second base cross support extending between and interconnecting the first and second harness supports; and
   wherein the back support is securable to the chair.

2. The back support of claim 1 wherein the first and second harnesses are selectively adjustable to allow for a desired fit of the harnesses around the person.

3. The back support of claim 1 wherein the first and second harnesses are engageable with an additional harness structure for engaging a body of a person.

4. The back support of claim 1 wherein the first base cross support is positionally adjustable along the first and second harness supports for adjustment of the back support.

5. The back support of claim 1 wherein each of the first and second harnesses comprises at least one elastomeric portion to provide for resilient stretching of the harness.

6. The back support of claim 1 wherein the first and second harnesses are in the form of elastomeric straps.

7. The back support of claim 1 further comprising at least one chair engaging member for securing the back support to the chair.

8. The back support of claim 7 wherein the at least one chair engaging member securely retains the base support structure against a chair.

9. The back support of claim 7 wherein the chair engaging member is positionally adjustable in a transverse direction to the first and second harness supports.

10. The back support of claim 7 wherein the at least one chair engaging member is coupled to and extends from the base support structure.

11. The back support of claim 10 wherein the distance between a distal end portion of the at least one chair engaging member and the base support structure is selectively adjustable to allow for tightening and loosening of the back support to the chair.

12. The back support of claim 7 wherein the at least one chair engaging member is engageable with a headrest of the chair.

13. The back support of claim 12 wherein the at least one chair engaging member is engageable with a headrest support post of the headrest.

14. The back support of claim 13 wherein the at least one chair engaging member has a hook portion for engaging the headrest support post.

15. The back support of claim 12 comprising at least two chair engaging members, each of the at least two engaging members engageable with the headrest of the chair.

16. The back support of claim 15 wherein each of the at least two chair engaging members is engageable with at least one headrest support post of the headrest.

* * * * *